Figure 1:
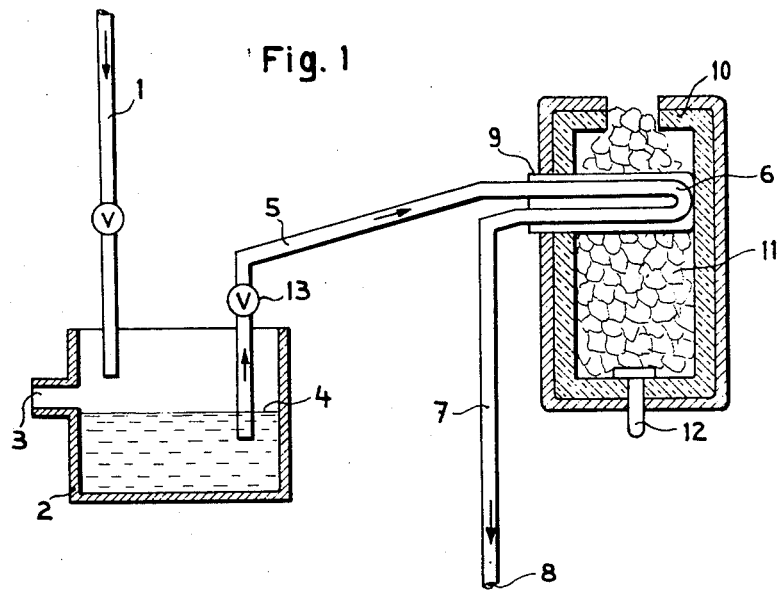

June 18, 1957  E. HALM  2,796,451
ELECTRIC OVEN ELECTRODE COOLING APPARATUS
Filed June 3, 1954

INVENTOR.
EDUARD HALM
BY
ATTORNEY

United States Patent Office 2,796,451
Patented June 18, 1957

2,796,451
ELECTRIC OVEN ELECTRODE COOLING APPARATUS

Eduard Halm, Zurich, Switzerland

Application June 3, 1954, Serial No. 434,232

Claims priority, application Switzerland August 10, 1953

4 Claims. (Cl. 13—23)

This invention relates to apparatus adapted to prevent the flow of cooling medium through an electric oven electrode from leaking into the oven as a result of a weak spot developing in the electrode or on an outright rupture of the electrode.

Electric oven electrodes made of metal, rather than of carbon or graphite, are prior known and are preferred in that they may be provided with cooling passages therein and, in any event, are not consumed as are the carbonaceous electrodes and have a longer useful life. Heretofore and notwithstanding such advantages, cooled metal electrodes have not been used as extensively as might otherwise be warranted because of the possibility of weak spots pervious to the cooling medium and to the ambient gaseous atmosphere developing and permitting the cooling medium to flow onto the hot charge in the oven, causing excessive pressures and even explosions therein.

An object of this invention is to provide apparatus for cooling such electrodes so that under no circumstances may the cooling medium, for example water, flow into the oven.

A further object is to provide a system in which the cooling medium in the cooling path through the electrode is at a pressure less than that of the atmosphere external to the oven and that prevailing within the oven.

Still a further object of the instant invention is to so construct the cooling channel of the electrode per se as an integral part of a siphon to render the cooling operation, once initiated, completely automatic and independent of all other contingencies, and to assure automatic cessation of the cooling medium flow on the development of a gas pervious region in any part of the wall of the electrode cooling channel.

In the system of my instant invention the cooling medium is drawn through the cooling medium piping and the electrode from a source which, in the direction of flow, lies in advance of the electrode and below the lowest point of the cooling channel within the electrode by means of a suction device positioned beyond the electrode. The suction device may be, for example, a pump, an injector, or the longer pressure column of cooling medium in a siphon pipe system. The portion of the cooling path lying within the electrode itself is hereinafter designated the "electrode cooling channel." By such arrangement, the liquid cooling medium in the entire electrode cooling channel is at a pressure which is less than atmospheric and also less than the pressure prevailing within the oven. If then, for any reason whatsoever, a liquid or gas pervious region develops in the electrode cooling channel, air or gas is immediately sucked thereinto and no cooling medium can flow out from such region. Should the weak spot become large enough and sufficient gas be drawn into the electrode cooling channel, the flowing liquid column will be severed and the cooling medium, still in the electrode cooling channel and in the cooling piping, will flow back to the source in advance of the electrode and to the outlet beyond the electrode, respectively. To facilitate the return flow of the cooling medium in advance of the weak region or break, that is, between the weak region or break and the source, the source is provided with an overflow outlet at such level which, for normal operation of the cooling system, is above the highest possible liquid level but below the lowest point of the electrode cooling channel. Such overflow outlet may be a port in the source or at the top of a liquid riser tube, as hereinafter illustrated, and permits the ready outflow therethrough not only of the liquid cooling medium between the source and the electrode break but also of such additional cooling medium as may thereafter flow into the source from the mains.

In that the use of pumps and injectors may result in the interruption of the cooling medium flow through the electrode for other causes, for example, failure of power supply for the pump or injector, I prefer, in the absence of other special considerations, to use the siphon system since that is entirely independent in its operation of other factors, and operates automatically without complicated electrical or mechanical devices which themselves might break down.

Figure 2:
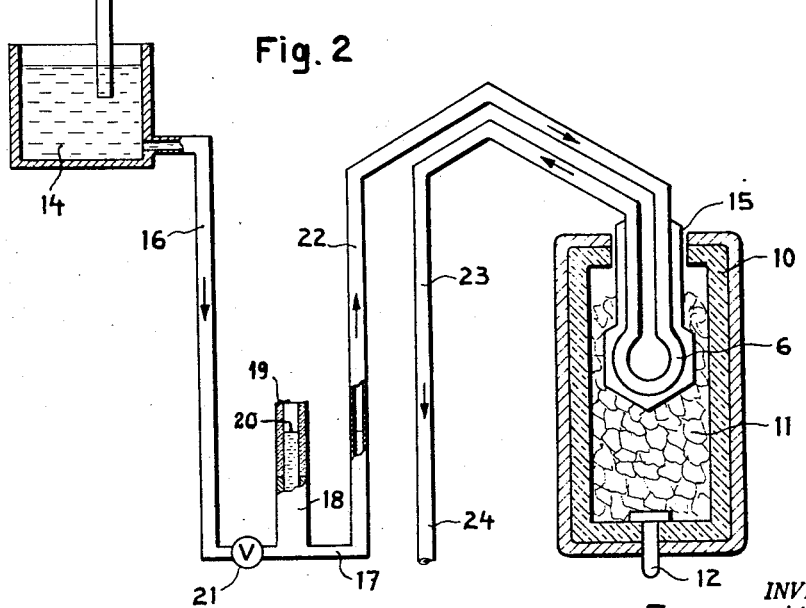

A complete understanding of my invention may be obtained from the following description of the method of my invention and of apparatus constituting illustrative embodiments thereof, when read in conjunction with the accompanying drawing, in which:

Figure 1 shows, in highly simplified form, an illustrative arrangement of apparatus for practicing the instant invention with an electrode positioned horizontally, and Figure 2 similarly shows another illustrative embodiment for practicing the instant invention with an electrode positioned vertically.

Referring to Figure 1, the line 1 supplies water from the mains to an open resorvoir 2 having an overflow outlet 3 in its upper region. The water level 4 in the open reservoir is maintained constant and just below the outlet 3 by any known means, such as a float cooperating with the valve V in the line 1. Piping 5 from below the surface of the water in the reservoir is connected to the inlet of the electrode cooling channel 6, while piping 7, connected to the outlet port of the electrode cooling channel, permits the cooling medium to flow out into the atmosphere at its end 8. The electrode 9 is shown inserted horizontally into the electric oven 10 so that it makes contact with the oven charge 11, of which the bottom is engaged by the usual plate electrode 12. For convenience in replacing electrodes, etc., a valve 13 is inserted at a convenient point in pipe 5 to shut off the flow of water when required. Overflow outlet 3 and the free level 4 of the water in the reservoir are positioned below the lowermost region of the electrode cooling channel 6, and the free end of the outflow end 8 of piping 7 is below the plane of the free surface 4 and hence below that of outlet 3. As will be apparent the piping system 5, 6 and 7, constitutes a siphon which, once started, automatically and continuously draws water from the reservoir 2 through the electrode cooling channel 6 as the level of the electrode cooling channel is above the free level 4 of the water in reservoir 2 and the siphon action is maintained, it follows that the water within the electrode cooling channel 6 is at less than atmospheric pressure and less than that prevailing for the gas chamber within the oven. Thus, if the electrode cooling channel for any reason becomes leaky, gas is immediately drawn into the piping system while the liquid cannot flow out of the leak. If the leaky region is large enough sufficient gas enters the piping to interrupt the siphon and the water of the ruptured water column will outflow through overflow outlet 3 and outflow end 8 respectively. Water flowing from the main line 1 into the reservoir 2 will now no longer be drawn into the riser tube 5, since that is now filled with gas but will overflow through outlet 3. Hence, it is not possible for water to flow into the oven.

In Figure 2, an open water reservoir 14 is positioned at some point relatively elevated with respect to an electric oven 10 into which an electrode 15, similiarly provided with an electrode cooling channel 6, is inserted vertically, so that lower region makes contact with clumps of the oven charge 11. Pipe 16 brings water from the reservoir down to the substantially horizontal pipe 17 which is at a level considerably below the lowermost point of the electrode cooling channel of electrode 15. A vertical riser tube 18 extends upwardly from pipe 17 and has its end 19, which is open to the atmosphere, also well below the lowermost point of the electrode cooling channel 6 of the electrode 15. The upper portion of riser tube 18 is preferably of a transparent material, such as glass, so that the level 20 of the water therein may be readily observed. Level 20 is controlled for normal operation by valve 21, positioned ahead, in the direction of flow, of the riser tube in pipe 17, to be at a predetermined height above pipe 17. Piping 22 connects the pipe 17 beyond the riser tube 18 to the inlet of electrode cooling channel 6, while piping 23 connected to the outlet of the electrode cooling channel permits the cooling medium to flow out into the atmosphere at its end 24 which is positioned below level 20 and hence below open end 19 of riser tube 18. It will be apparent that, as with piping 5 and 7 and electrode cooling channel 6 in Figure 1, piping 22, from the level therein corresponding to level 20 in the riser tube, electrode cooling channel 6 and piping 23, constitute a siphon system of which the operation is as described for that of Figure 1 with the open end 19 functioning as does overflow outlet 3, on rupture of the siphon.

What I claim is:

1. A cooling system for electrodes used in a gaseous atmosphere, such as in electric resistance ovens, comprising a cooling liquid, a channel in the electrode for the passage of cooling liquid therethrough, a receptacle open to the atmosphere and positioned remote from the electrode, the cooling liquid filling the receptacle to a free surface in a plane below the lowermost channel point a distance not in excess of the column of the cooling liquid supportable by the atmosphere, first piping having one end below the surface of the liquid within the receptacle and its other end connected to the channel inlet end, and second piping connected at one end to the channel outlet end and its other end open to the atmosphere in a plane below the free liquid surface in the receptacle, the cooling liquid also filling the first piping, the channel and the second piping completely to maintain a flow of the cooling liquid therethrough which on the channel becoming pervious to gas is interrupted without leakage of cooling liquid through the pervious channel.

2. A cooling system according to claim 1 in which the receptacle is a reservoir having an overflow outlet above the free surface of the liquid therein but below the lowermost channel point, and the first piping in the region thereof between the free surface of the liquid in the receptacle and the channel inlet end includes a shut-off valve.

3. Cooling system according to claim 1 in which the cooling liquid receptacle is a reservoir having an overflow outlet above the free surface of the liquid therein and in a plane below the lowermost channel point.

4. Cooling system according to claim 1 in which the cooling liquid receptacle comprises an open ended riser pipe having its upper portion of transparent material to enable observation of the free liquid surface therein, the upper end of the riser tube being in a plane below the lowermost channel point, a horizontal pipe from which the riser pipe extends upwardly, a reservoir of cooling liquid at an elevated position relative to the horizontal pipe, intermediate piping connecting the reservoir to one end of the horizontal pipe, and a control valve in the horizontal pipe between the reservoir and the riser tube for positioning the free liquid surface adjacent the upper open end of the riser tube, the end of the first piping below the free surface plane of the liquid being connected to the other end of the horizontal pipe.

References Cited in the file of this patent

UNITED STATES PATENTS

| | | |
|---|---|---|
| 658,412 | Westman | Sept. 25, 1900 |
| 2,429,959 | Peake et al. | Oct. 28, 1947 |